United States Patent
Wells

(10) Patent No.: US 7,477,777 B2
(45) Date of Patent: Jan. 13, 2009

(54) AUTOMATIC COMPOSITING OF 3D OBJECTS IN A STILL FRAME OR SERIES OF FRAMES

(75) Inventor: Barton S. Wells, Palo Alto, CA (US)

(73) Assignee: Aepx Animation, Inc., Los Altos, CA (US)

( * ) Notice: Subject to any disclaimer, the term of this patent is extended or adjusted under 35 U.S.C. 154(b) by 14 days.

(21) Appl. No.: 11/262,262

(22) Filed: Oct. 28, 2005

(65) Prior Publication Data

US 2007/0098290 A1    May 3, 2007

(51) Int. Cl.
G06K 9/00    (2006.01)
G06T 15/00   (2006.01)
G09G 5/00    (2006.01)

(52) U.S. Cl. .................. 382/154; 345/419; 345/619

(58) Field of Classification Search .......... 345/421, 345/586, 632, 633
See application file for complete search history.

(56) References Cited

U.S. PATENT DOCUMENTS

| | | | |
|---|---|---|---|
| 5,359,704 A | 10/1994 | Rossignac et al. | 395/122 |
| 5,561,746 A | 10/1996 | Murata et al. | 395/119 |
| 5,579,454 A | 11/1996 | Billyard et al. | 395/121 |
| 5,594,850 A * | 1/1997 | Noyama et al. | 345/632 |
| 5,615,322 A | 3/1997 | Murata et al. | 395/133 |
| 5,644,689 A | 7/1997 | Ban et al. | 395/124 |
| 5,805,135 A | 9/1998 | Suzuoki et al. | 345/139 |
| 5,870,099 A | 2/1999 | Horii et al. | 345/427 |
| 5,877,769 A | 3/1999 | Shinohara | 345/425 |
| 5,977,979 A | 11/1999 | Clough et al. | 345/422 |
| 6,034,691 A | 3/2000 | Aono et al. | 345/425 |
| 6,091,422 A | 7/2000 | Ouaknine et al. | 345/419 |
| 6,166,744 A * | 12/2000 | Jaszlics et al. | 345/629 |
| 6,201,546 B1 | 3/2001 | Bodor et al. | 345/430 |
| 6,226,005 B1 | 5/2001 | Laferriere | 345/426 |
| 6,392,644 B1 | 5/2002 | Miyata et al. | 345/419 |
| 6,400,364 B1 | 6/2002 | Akisada et al. | 345/427 |
| 6,417,850 B1 | 7/2002 | Kang | 345/422 |
| 6,784,882 B1 | 8/2004 | Sugiyama | 345/419 |
| 2002/0008697 A1 | 1/2002 | Deering | 345/418 |
| 2002/0050988 A1 | 5/2002 | Petrov et al. | 345/418 |
| 2005/0001834 A1 | 1/2005 | Sugiyama | 345/419 |
| 2006/0170956 A1* | 8/2006 | Jung et al. | 358/1.15 |
| 2007/0248282 A1* | 10/2007 | Suzuki | 382/282 |

(Continued)

OTHER PUBLICATIONS

Jacobs et al. "Automatic generation of Consistent Shadows for Augmented Reality", K Jacobs, JD Nahmias, C Angus, A Reche, C Loscos, and A Steed—Proceedings of the 2005 conference on Graphics interface, May 2005.*

(Continued)

*Primary Examiner*—Charles Kim
(74) *Attorney, Agent, or Firm*—Zilka-Kotab, PC

(57) ABSTRACT

Systems, methods, and computer program products that provide broadcast-quality photo-realistic rendering of one or more 3D objects added to a still frame (photo mode), or series of frames (movie mode). The basic steps performed during creation of an image include analysis of a 2D image frame during a set up sequence, adding a 3D object to the frame, and adding visual effects to the frame with little or no user intervention, the visual effects including but not limited to shadowing, reflection, refraction, and transparency.

49 Claims, 10 Drawing Sheets

U.S. PATENT DOCUMENTS

2007/0280554 A1* 12/2007 Chernichenko et al. ..... 382/275

OTHER PUBLICATIONS

Cucchiara et al. "Detecting Objects, Shadows and Ghosts in Video Streams by Exploiting Color and Motion Information", Cucchiara, R., Grana, C., Piccardi, M., and Prati, A., Image Analysis and Processing, 2001. Proceedings. 11th International Conference on, Sep. 26-28, 2001, pp. 360-365.*

Loscos et al. "Interactive Virtual Relighting of Real Scenes", C. Loscos, G. Drettakis, L. Robert, IEEE Transactions on Visualization and Computer Graphics, vol. 6, No. 4, Dec. 2000.*

Pomi et al. "Streaming Video Textures for Mixed Reality Applications in Interactive Ray Tracing Environments", A Pomi, G Marmitt, I Wald, P Slusallek—Proceedings of Virtual Reality, Modelling and Visualization, 2003.*

Haller et al. "A real-time shadow approach for an Augmented Reality application using shadow volumes", M Haller, S Drab, W Hartmann, ACM symposium on Virtual reality software, 2003.*

Agarwal et al. "Learning a Sparse Representation for Object Detection", Computer Vision—ECCV 2002: 7th European Conference on Computer Vision, Copenhagen, Denmark, May 28-31, 2002. Proceedings, Part IV, 2002.*

Wloka et al. "Interactive real-time motion blur", The Visual Computer, vol. 12, No. 6 / Jun. 1996.*

Adobe Photoshop 7.0 User Guide, 2002, pp. 10, 44-46, 87-102, 124-126, 134-136, 138-139, 140-147, 365 and "Photoshop 7.0: Color Correction and Printing," pp. 1-3.*

\* cited by examiner

400

| 10 | 12 | 11 |
| --- | --- | --- |
| 11 | 23 | 12 |
| 10 | 14 | 15 |

| -1 | 0 | +1 |
| --- | --- | --- |
| -2 | 0 | +2 |
| -1 | 0 | +1 |

| +1 | +2 | +1 |
| --- | --- | --- |
| 0 | 0 | 0 |
| -1 | -2 | -1 |

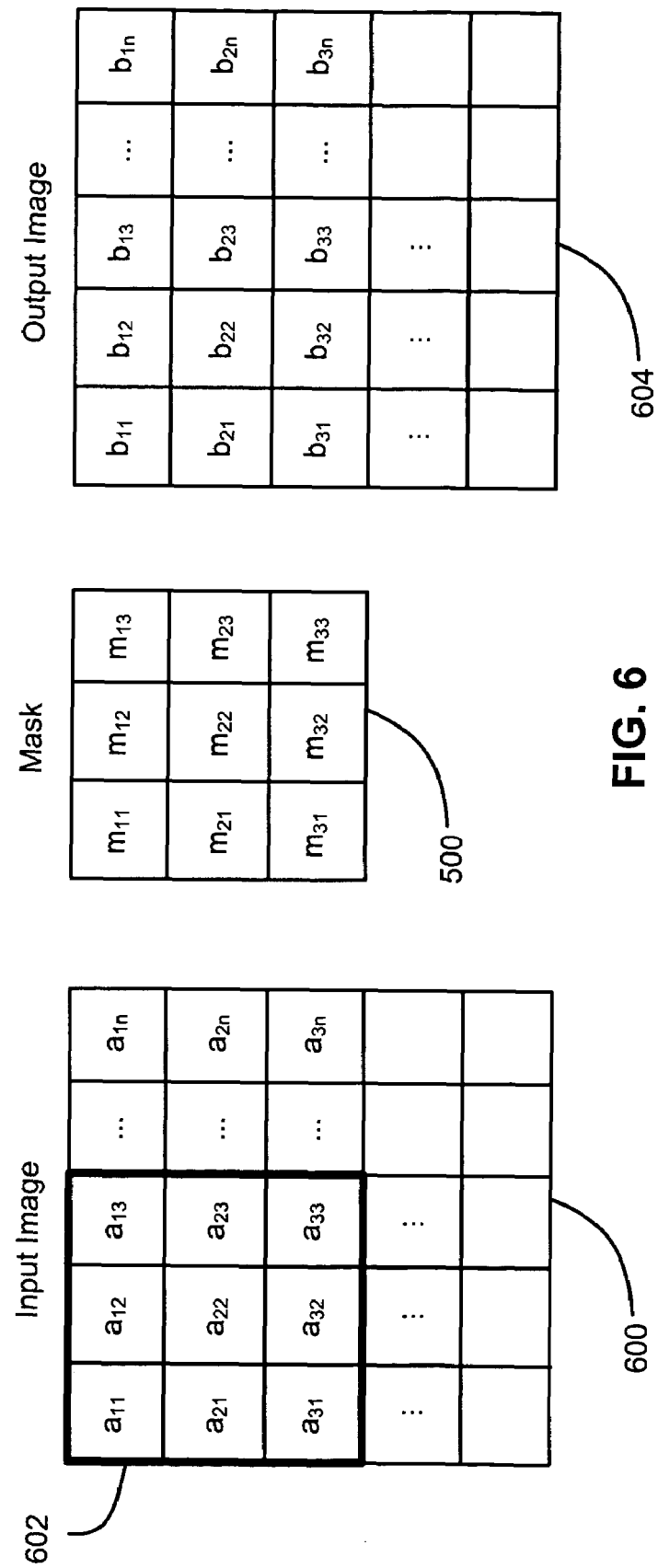

700

| -1 | -1 | -1 | -1 | -1 |
|---|---|---|---|---|
| -1 | -1 | -1 | -1 | -1 |
| -1 | -1 | 24 | -1 | -1 |
| -1 | -1 | -1 | -1 | -1 |
| -1 | -1 | -1 | -1 | -1 |

800

| $1/\sqrt{2}$ | 1 | $1/\sqrt{2}$ |
|---|---|---|
| 1 | 4.5 | 1 |
| $1/\sqrt{2}$ | 1 | $1/\sqrt{2}$ |

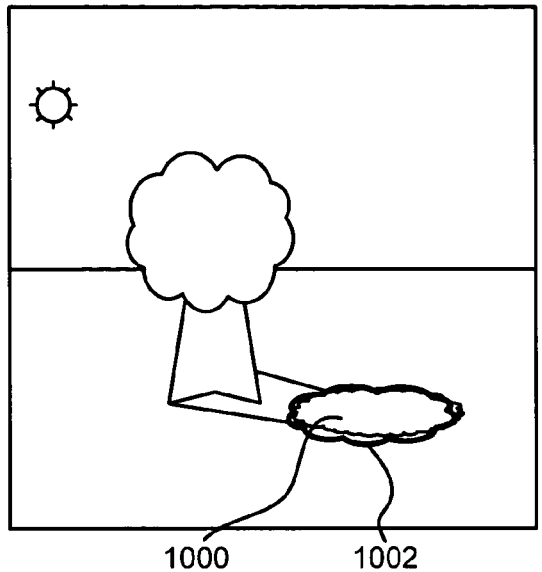
FIG. 10A
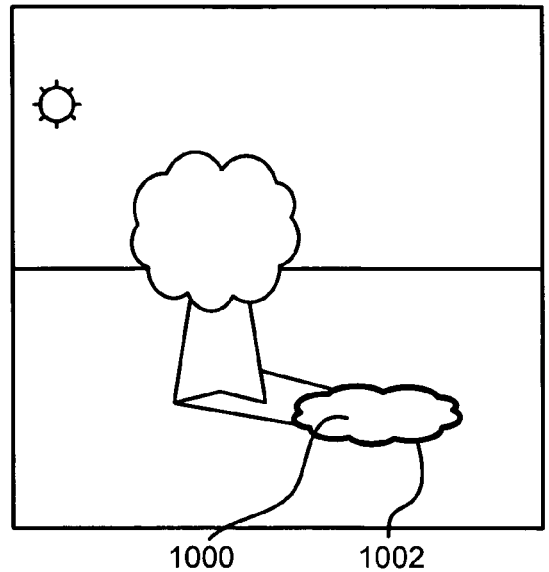
FIG. 10B
1100
| out | out | in |
|-----|-----|-----|
| out | in  | in  |
| in  | in  | in  |
6 pixels in of 9 pixels total
FIG. 11

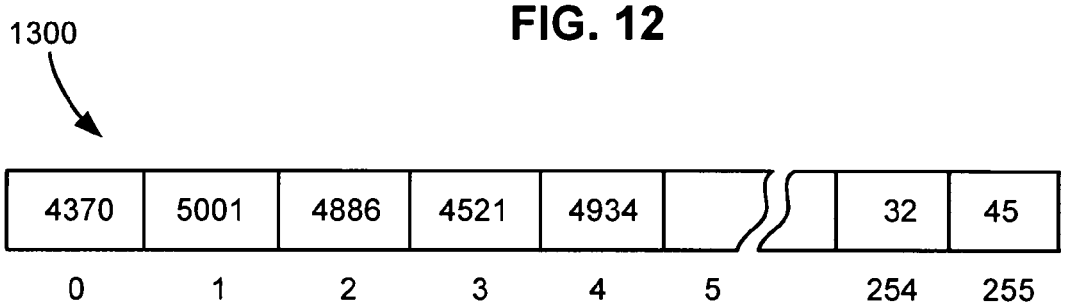
FIG. 12
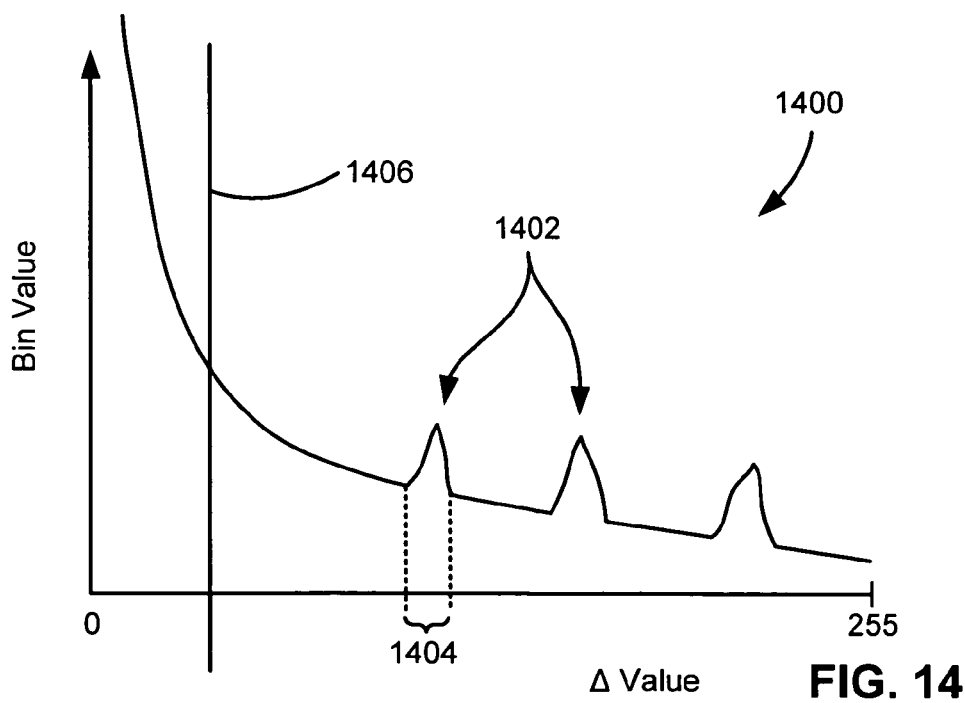
FIG. 13
FIG. 14

AUTOMATIC COMPOSITING OF 3D OBJECTS IN A STILL FRAME OR SERIES OF FRAMES

FIELD OF THE INVENTION

The present invention relates to image rendering, and more particularly, this invention relates to automated, accurate compositing of three dimensional (3D) objects added to a two dimensional (2D) frame or series of 2D frames.

BACKGROUND OF THE INVENTION

Photography and moviemaking have become staples in modern society. A photograph is typically a single image frame of a real scene. Movies can be described as a series of frames that together form what appears to the human eye to be a continuously moving image. Both photographs and movies are now found in both physical and digital formats.

In recent years, advances in technology have allowed creation of entirely three dimensional worlds. 3D graphic systems are able to produce an image on a two-dimensional screen of a display in such a manner that the image simulates three-dimensional effects. In such 3D systems, the surface of a 3D object to be represented is separated into a plurality of polygonal surfaces having various arbitrary shapes. Picture data representing the polygonal areas of the 3D object are successively stored in a frame memory having memory locations corresponding to positions on a display screen to accumulate picture data which, when supplied to the display, reconstruct an image which appears to be three-dimensional.

In such 3D systems the data representing each of the polygonal surfaces must be transformed in order to represent three-dimensional effects such as rotation of the object they represent. In 3D systems the image data for the various polygonal surfaces are produced in succession based on data indicating the depth of each polygonal surface from the plane of the display screen. Conventional 3D systems produce image data representing the polygonal surfaces of an object such that surfaces which cannot be seen from the point of view when displayed are produced first and stored in a display memory and the remaining data representing the polygonal surfaces are successively produced in order according to their depth from the screen. Consequently, image data representing a polygonal surface at the front of the object cover over the image data of reverse surfaces which previously were produced and stored. It is necessary, therefore, to include data indicating the depth of each polygonal surface (referred to as "Z data") and the order in which the data representing the polygons are produced is determined by reference to such Z data. In the conventional 3D systems a Z buffer is provided to store the Z data in pixel units and the stored Z data are compared to determine a display preference.

In conventional 3D systems, an effect of the environment on 3D objects is relatively easy to compute, as the environment also has Z data assigned to it, in addition to X (horizontal) and Y (vertical) data. However, where the environment does not have Z data associated with it, and is thus by definition a 2D environment, effects of the 2D environment on 3D objects such as reflection, refraction, shadows, etc. have heretofore not been readily and accurately rendered.

It has also been proposed in the prior art to implement a system wherein 2D image data would be produced by means of a conventional 2D system and three-dimensional image data would be produced by means of a conventional 3D system independently of the 2D system. The 2D image data and the 3D image data which have been produced independently are then added upon conversion into a video signal to be supplied to a video display device. However, this system too fails to allow accurate rendering of environmental effects on a 3D object.

Additionally, both methods simply overlay the 3D object over the 2D background image.

Consider, for example, movies which add 3D objects to a background image of a real scene. Current methods render the 3D object in a 3D renderer, and composite the 3D image on the 2D frames of a film. Then, artists must go back and, frame by frame, manually draw shadows and reflections on the 3D object. This is a very time consuming and thus expensive job, considering that a typical movie runs at about 30 frames per second.

If the 3D object is supposed to be positioned behind something on the frame, present systems require that a user manually create an image mask that is exactly the same size and shape as the 2D object to be shown in front of the 3D object.

Another mask, a shadow mask, is created by hand for the shadowing created by or cast onto the 3D object. Shadowing is currently performed by dimming the image, which is not an accurate representation of a shadow. Rather, the dimming appears more like a fuzzy area rather than an accurate representation of how the shadow will be cast. The typical method is to manually hand-draw a shadow mask for each frame by using ADOBE® PHOTOSHOP® or other manual graphics program.

If the designer further wants reflections in the scene, artists are called upon to make reflection maps. These are texture maps that go on the 3D model. This requires the artists to estimate what the scene around the 3D object looks like, and map this onto the 3D model. One problem is that the reflections do not look realistic, particularly on rounded or angled surfaces. Heretofore methods have not been able to accurately create the natural deformation of the reflection due to curvature of the reflecting surface. Particularly, human artists find it very difficult to conceptualize this deformation and create it in the reflection in the composite image.

Again, the state of the art is to manually perform all of these functions frame by frame, as the 2D image data does not have Z data assigned to it.

Additionally, if a surface of the 3D object is partially transparent, artists merely shade the pixels of the 2D image that would be viewable through the transparent portion of the 3D object. However, most transparent surfaces are refractive. Current methods do not account for refractive distortion.

What is therefore needed is a way to automatically perform not only rendering of a 3D image in a 2D scene, but also to add realistic shadowing, reflection, refraction, transparency and other effects automatically. This would save an immense amount of man-hours when generating animations, as the role of artists could then be greatly reduced and even eliminated. Such a solution would also reduce the inherent flaws in the effects heretofore manually created by human artists.

SUMMARY OF THE INVENTION

Systems, methods, and computer program products that provide broadcast-quality photo-realistic rendering of one or more 3D objects added to a still frame (photo mode), or series of frames (movie mode).

The basic steps performed during creation of an image include analysis of a 2D image frame during a set up sequence, adding a 3D object is added to the frame, and adding visual effects to the frame with little or no user intervention, the visual effects including but not limited to shadowing, reflection, refraction, and transparency.

In one embodiment, a 2D image is analyzed for determining several of its properties. These properties may include one or more of hue (H), saturation (S), brightness value (V), and red, green and blue (RGB) color intensity. HSVRGB values for each pixel are stored. The image is smoothed and edges in the frame are detected. Lines are refined based on the detected edges. The shadows in the 2D image are detected based on analysis of HSV of interesting pixel and surrounding pixels. Shadows in the frame are matched with the edges to refine and further define the shadows in the frame. Objects in the frame are identified such as by using a flood fill algorithm to find areas outside shadows having similar HSVRG or B values. This completes the setup of the 2D image frame in this embodiment. One or more 3D objects are added to the frame. Occulting is performed to provide the effect of depth. In other words, the objects of the 2D image are analyzed to intelligently estimate which objects in the frame are in front of or behind the 3D object based on the position of the object in the frame relative to the 3D object. Since the shape of each 3D object in every direction is known, ray tracing can be used to intelligently add visual effects to the composite image. For example, reflections of one or more of the objects can be rendered on the 3D object, taking into account any curvature of the 3D object. The shadows found are adjusted to be properly cast onto the surface of the 3D object. A representation of one of the objects in the 2D image viewable through a transparent or semi-transparent portion of the 3D object may be rendered on the outer surface of the 3D image. This may include effective rendering on the outer surface of the 3D image by merely shading a portion of the background image that would be viewable through the transparent portion of the 3D object. Any portion of the 2D image viewable through a transparent or semi-transparent portion of the 3D object may be adjusted to reflect the effect of refraction caused by the transparent portion of the 3D object. Other effects can also be added. For example, atmospheric effects can be estimated from analysis of the 2D image and added to the 3D object.

Additional embodiments and features of the present invention are presented below.

The invention can be implemented entirely in hardware, entirely in software, or a combination of the two. The invention can also be provided in the form of a computer program product comprising a computer readable medium having computer code thereon.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

FIG. 4 illustrates a mask for neighborhood averaging, used during a smoothing process according to one embodiment of the present invention.

FIGS. 5A-B depict Sobel masks, used during an edge detection process according to one embodiment of the present invention.

FIG. 6 illustrates processing using a Sobel mask.

FIG. 10A illustrates an image generated by a shadow detection process.

FIG. 10B illustrates an image having enhanced shadow definition after a shadow detection process.

FIG. 11 depicts a mask used during a shadow softening process.

FIG. 12 illustrates a portion of an image during a histogram-based object recognition process.

FIG. 13 depicts a representation of bins used during a histogram-based object recognition process.

FIG. 14 illustrates a representative histogram used during a histogram-based object recognition process.

BEST MODE FOR CARRYING OUT THE INVENTION

The following description is the best embodiment presently contemplated for carrying out the present invention. This description is made for the purpose of illustrating the general principles of the present invention and is not meant to limit the inventive concepts claimed herein. Further, particular features described herein can be used in combination with other described features in each of the various possible combinations and permutations.

The following specification describes systems, methods, and computer program products that provide broadcast-quality photo-realistic rendering of one or more 3D objects added to a still frame (photo mode), or series of frames (movie mode). Effects such as reflection, shadows, transparency, and refraction on or of the 3D object(s) relative to objects in the frame are automatically determined and added to the composite image. The software also dynamically determines what object in the frame should be in front of or behind the 3D object(s) and places those object in front of or behind the 3D object(s), as well as creates realistic reflections of the frame objects on the 3D object(s).

The invention can be implemented entirely in hardware, entirely in software, or a combination of the two. The invention can also be provided in the form of a computer program product comprising a computer readable medium having computer code thereon. A computer readable medium can include any medium capable of storing computer code thereon for use by a computer, including optical media such as read only and writeable CD and DVD, magnetic memory, semiconductor memory (e.g., FLASH memory and other portable memory cards, etc.), etc.

A computer for storing and/or executing the code and/or performing the processes described herein can be any type of computing device, including a personal computer (PC), laptop computer, handheld device (e.g., personal digital assistant (PDA)), portable telephone, etc.

Figure 1:
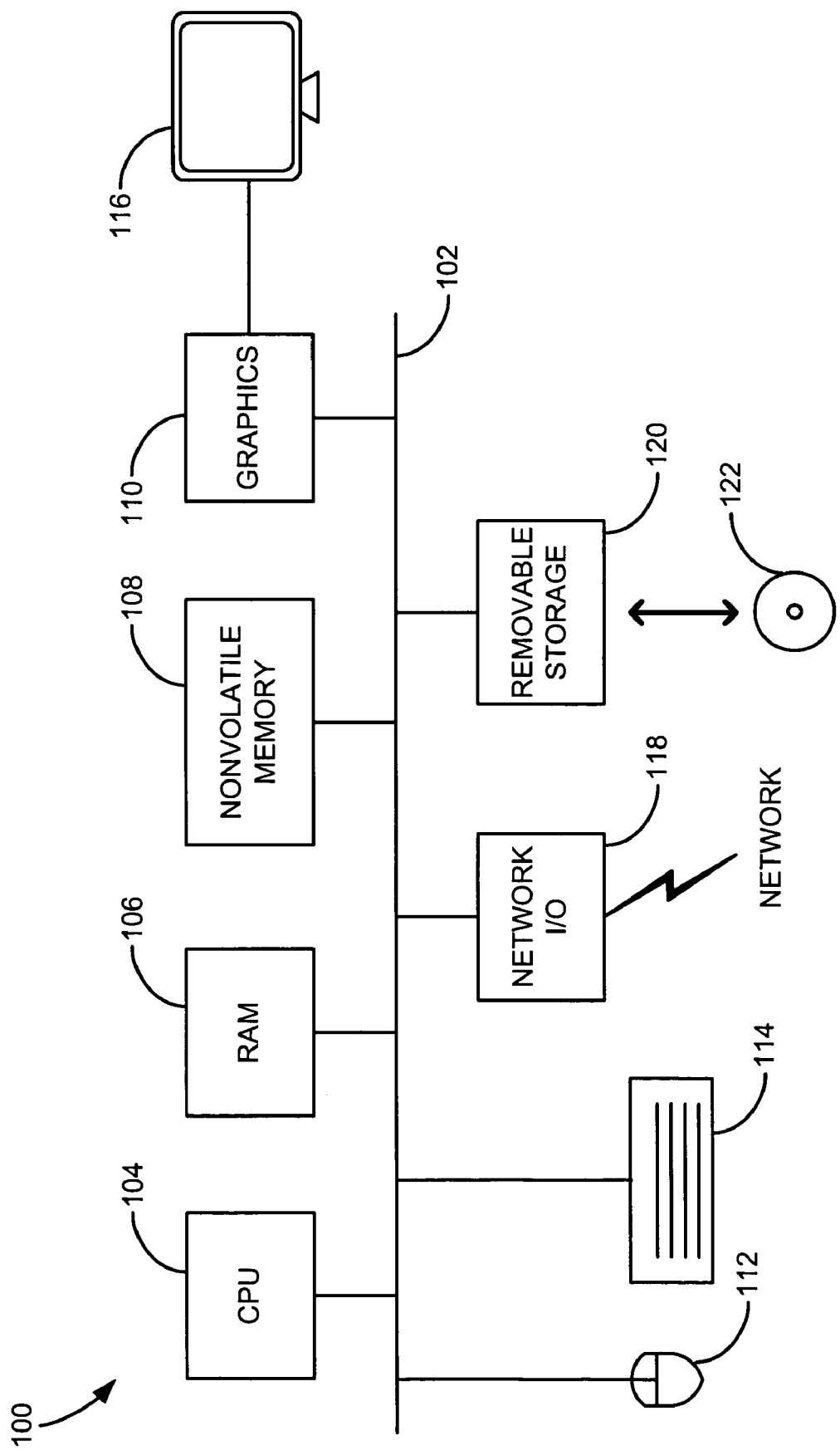
FIG. 1 illustrates a hardware system useable in the context of the present invention.

FIG. 1 illustrates a computer 100 according to one embodiment. As shown, the computer 100 includes a system bus 102 to which a processor 104 is coupled. The processor 104 executes instructions found in the code, and controls several of the other components of the computer 100. Memory including Random Access Memory (RAM) 106 and nonvolatile memory 108 (e.g., hard disk drive) store the code or portions thereof, as well as data, during performance of the processes set forth herein. A graphics rendering subsystem 110 may also be present, and can include a separate graphics processor and additional memory.

Various In/Out (I/O) devices are also present. User input devices such as a keyboard 112 and mouse 114 allow a user to provide user instructions to the computer 100. A monitor 116 or other display device outputs graphical information to the user. If a graphics subsystem 110 is present (as shown), the display device can be coupled to the graphics subsystem 110 instead of directly to the bus 102. A network interface 118 may also be provided to allow the computer 100 to connect to remote computing devices for a variety of purposes including data upload, data download, etc. A media reader 120 such as a DVD player or FLASH memory port may be present for reading code from a computer readable medium 122.

The following description is applicable to creation of both still frame images as well as a series of frames, as in a movie. For simplicity, much of the following description shall refer to the functions performed on a single frame and single 3D object, it being understood that the procedures set forth herein can be sequentially applied to multiple frames, e.g., of a movie and for multiple 3D objects per frame.

To aid the reader in understanding the overall aspects of the invention, high level processes will first be described, followed by a detailed description of each operation. Note that the order of the steps performed is generally preferred, the order is not critical and the software can perform some operations prior to others, some in parallel, etc.

Figure 2:
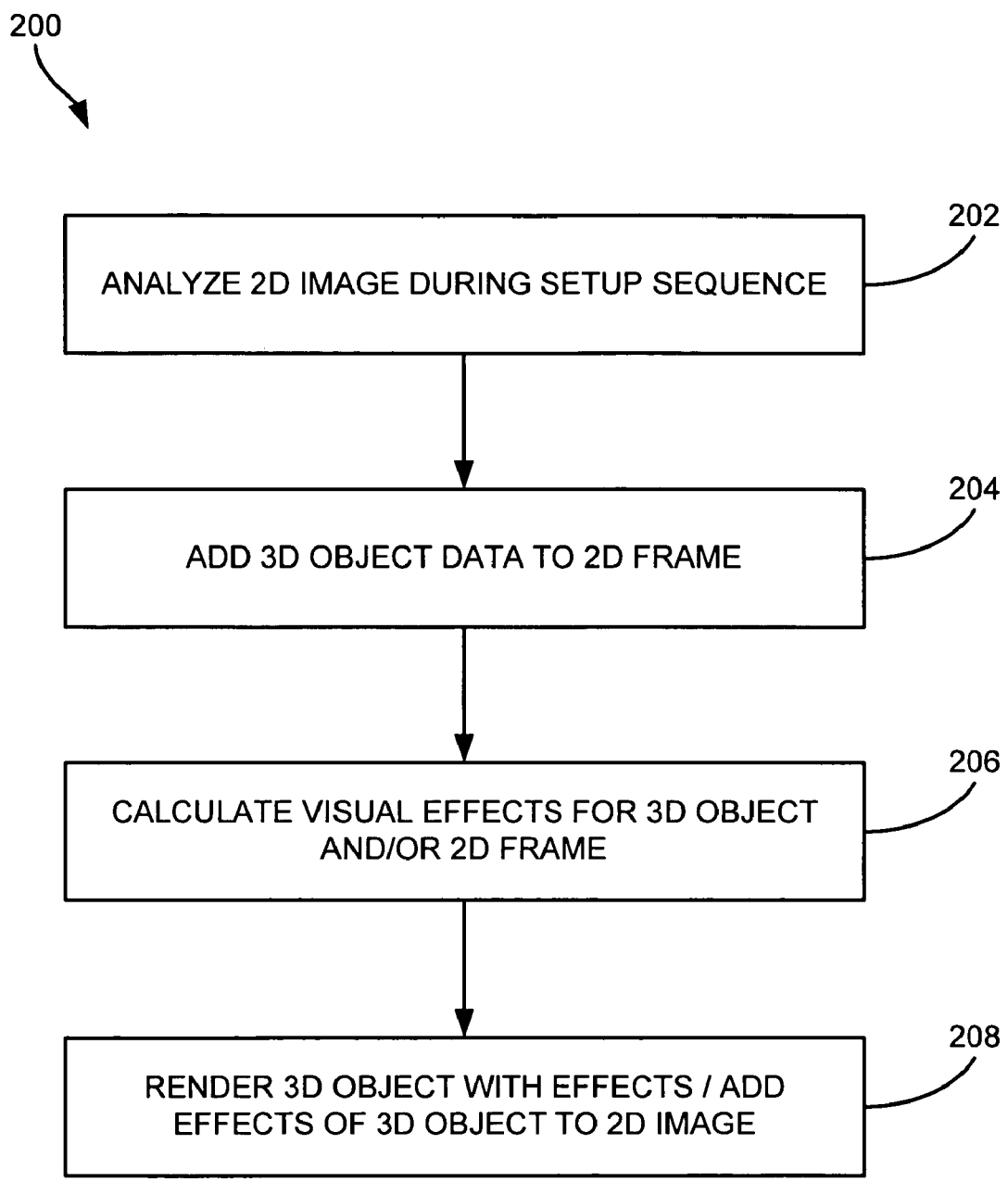
FIG. 2 is a flow diagram of a high level process of an embodiment of the present invention.

FIG. 2 depicts the high level process 200 performed during creation of an image. In operation 202, a 2D image is analyzed during a set up sequence. In operation 204, 3D object data is added to the scene. In operation 206, visual effects including but not limited to shadowing, reflection, refraction, and transparency are calculated for the 3D object and/or 2D image with little or no user intervention. In operation 208, the 3D image is then rendered into the frame with the calculated effects, along with any effects created by the 3D object on the 2D image, thereby creating a realistic, accurate, high-quality composite image.

Figure 3:
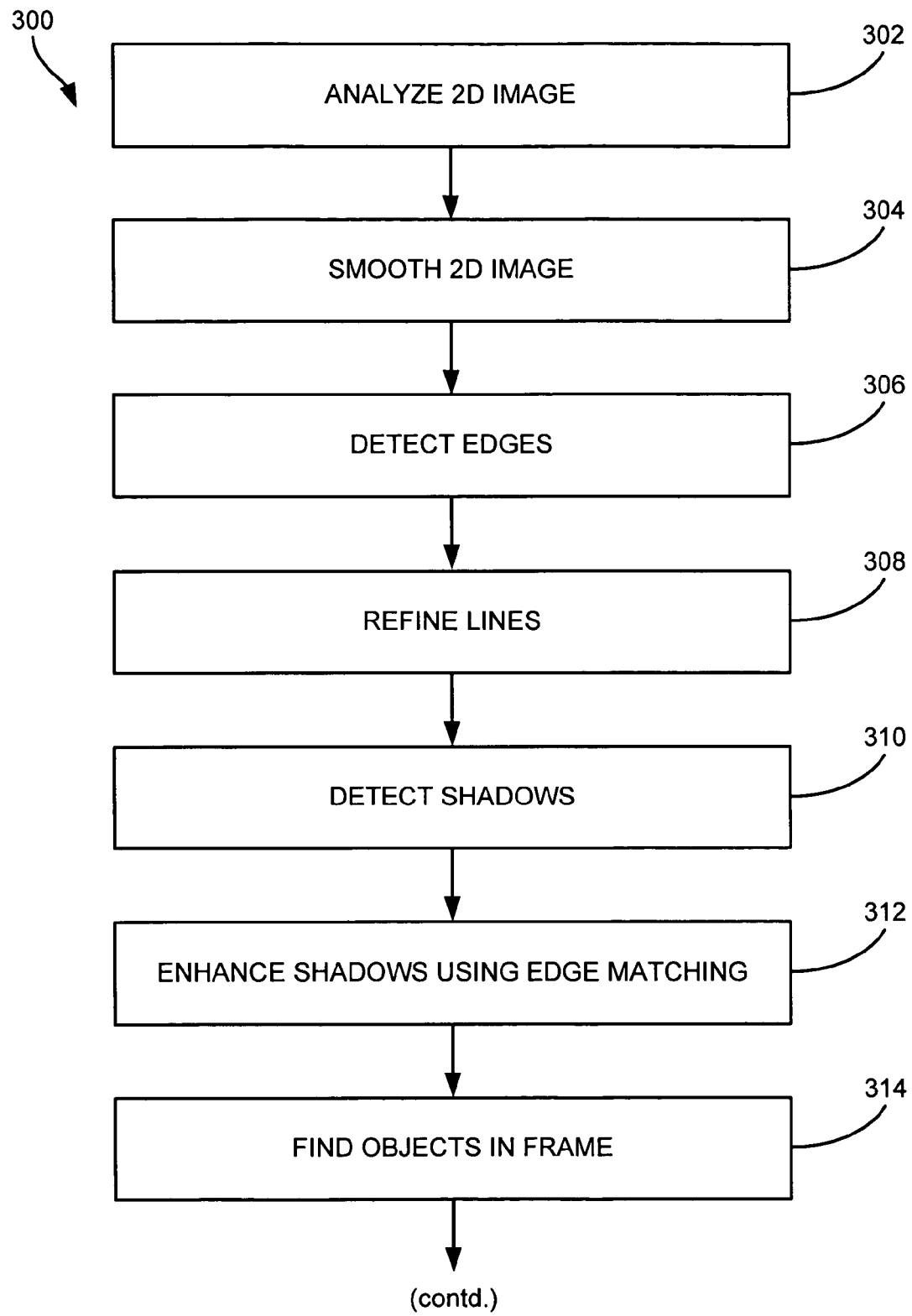
FIG. 3 is flow diagram of a process according to one embodiment of the present invention.
Figure 3:
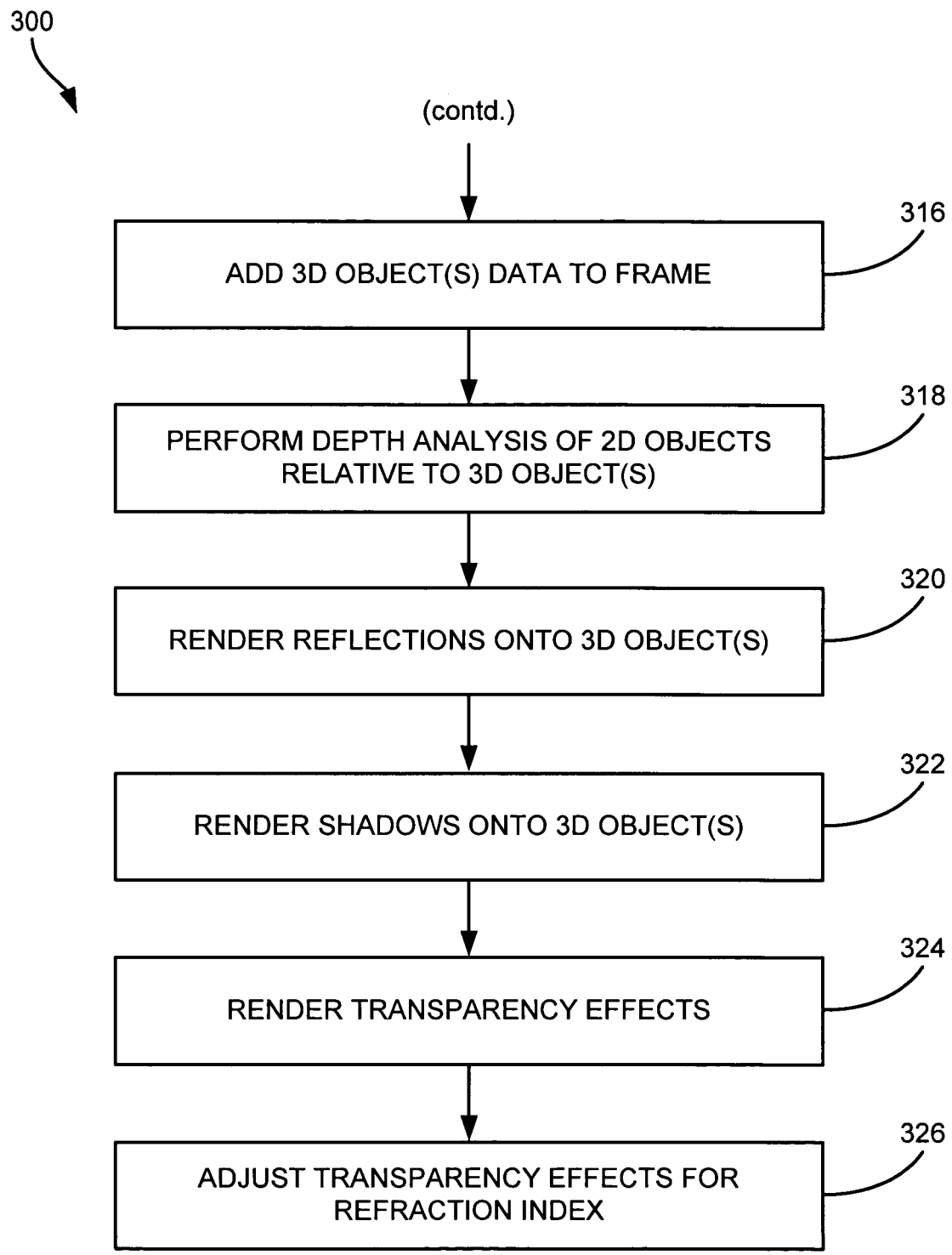

FIG. 3 illustrates the general process 300 performed by a preferred embodiment of the present invention. In operation 302, the 2D image is analyzed for determining several of its properties. These properties include hue (H), saturation (S), brightness value (V), and red, green and blue (R, G, B) color intensity. H, S, V, R, G, and B values for each pixel are stored in a frame buffer or buffers. In operation 304, the image is smoothed. In operation 306, edges in the 2D image are detected. In operation 308, lines are refined based on the detected edges. In operation 310, the shadows in the 2D image are detected, e.g., based on analysis of HSV of interesting pixel and surrounding pixels. In operation 312, shadows in the frame are matched with the edges found in operation 306 to refine and further define the shadows in the frame. In operation 314, objects on the frame are found, e.g., using a flood fill algorithm to find areas outside shadows having similar HSVRGB values. This completes the setup of the 2D image frame.

In operation 316, data relating to one or more 3D objects are added to the frame. In operation 318, the objects identified in operation 314 are analyzed to estimate which objects in the frame are in front of the 3D object based on the position of the object in the frame relative to the 3D object.

Since the shape of each 3D object in every direction is known, ray tracing can be used to intelligently add visual effects to the composite image. In operation 320, reflections of one or more of the objects found in operation 314 are rendered on the 3D object, taking into account any curvature of the 3D object. In operation 322, the shadows found in operations 310 and 312 are adjusted to be properly cast onto the surface of the 3D object. In operation 324, a representation of one of the objects in the 2D image viewable through a transparent or semi-transparent portion of the 3D object is rendered on the outer surface of the 3D image. Note that operation 324 includes effective rendering on the outer surface of the 3D image by merely shading a portion of the background image that would be viewable through the transparent portion of the 3D object. In operation 326, any portion of the 2D image viewable through a transparent or semi-transparent portion of the 3D object is adjusted to reflect the effect of refraction caused by the transparent portion of the 3D object.

Other embodiments of the present invention may perform only a subset of these steps and/or additional steps. Further, the order in which the steps for this and other disclosed processes are presented by way of example only, and is in no way meant to require that the present invention perform the steps in the same order presented. Rather, the various steps (or portion thereof) can be performed in any order.

Set Up

As noted above, the first stage is preparing the image for rendering. A 2D image is loaded into the host system. The 2D image can be, for example, a high quality natural image captured with a digital camera. The 2D image can also be a scanned from a picture, generated from film negatives, etc. The 2D image can further be a purely computer-generated 2D image.

The image in the 2D frame is analyzed to determine the Hue (H), Saturation (S) and brightness Value (V) of each pixel in the frame. Hue (H) refers to the relative color of the pixel on the red-green-blue color wheel. Saturation (S) is the degree of color depth. For example, a pure red is completely saturated while pure white is completely non-saturated. The brightness Value (V) indicates the brightness level of the pixel.

H, S, and V images of the 2D frame are created and stored in a frame buffer or buffers. The frame buffer may be a type of RAM, nonvolatile memory such as a magnetic disk, etc. If there are several frames, such as in a movie mode, each frame of the series of frames is analyzed, and HSV images are created and stored for each frame. R, G, and B values for each pixel in the frame are also stored in a frame buffer or buffers.

Now that the properties of the image in the frame are determined and stored, further processing using these properties is performed.

Leveling data may be created and stored for use in subsequent processing such as object identification. A R, G, B histogram is obtained of the whole image. Suppose there are 1,000,000 pixels in the image, and 256 shades per color. The number of pixels in each shade are stored in bins representing each shade from 0 to 255. For example, if 8,201 pixels have a R shade of 35, the bin for shade 35 will have a value of 8,201.

Each bin would have about 1,000,000/256=3906 pixels if the colors were evenly distributed. Using this value, the old image is mapped to the new image to obtain about an equal distribution of color across the entire image, thereby varying the contrast as much as possible. During the mapping sequence, bin 0 is summed with the next bin or bins until the sum>3906. Supposing bins 0-2 total 4000, then all pixels associated with bins 0-2 are give a first shade. Then bin 3 is added to the next bin or bins until the sum>3906. Then all pixels associated with bins 3-n are give a second shade. Thus, the color contrast is maximized. This in turn is useful for such things as object recognition using flood fill algorithms, as discussed below.

Next, the objects in the frame are identified. To identify objects in the image, edge detection is performed to detect edges in the frame, as edges tend to denote boundaries between or on objects. However, images usually have some sort of "noise" or edge distortion due to the inherent irregularities in real-life objects, as well as the limitations in the camera or scanner and as an effect of any compression. An example of image noise in a real-life object is found in concrete with a rock facade, where each rock has an edge and so appears to be its own object.

Thus, a smoothing process is preferably performed prior to detecting the edges. The purpose of noise smoothing is to reduce various spurious effects of a local nature in the image, caused perhaps by noise in the image acquisition system, or arising as a result of compression of the image, for example as is typically done automatically by consumer-grade digital cameras. The smoothing can be done either by considering the real space image, or its Fourier transform.

The simplest smoothing approach is neighborhood averaging, where each pixel is replaced by the average value of the pixels contained in some neighborhood about it.

The simplest case is probably to consider the 3×3 group of pixels centered on the given pixel, and to replace the central pixel value by the unweighted average of these nine pixels. For example, the central pixel in the mask 400 of FIG. 4 is replaced by the value 13 (the nearest integer to the average).

If any one of the pixels in the neighborhood has a faulty value due to noise, this fault will now be spread over nine pixels as the image is smoothed. This in turn tends to blur the image.

A more preferable approach is to use a median filter. A neighborhood around the pixel under consideration is used, but this time the pixel value is replaced by the median pixel value in the neighborhood. Thus, for a 3×3 neighborhood, the 9 pixel values are written in sorted order, and the central pixel is replaced by the fifth highest value. For example, again taking the data shown in FIG. 4, the central pixel is replaced by the value 12.

This approach has two advantages. First, occasional spurious high or low values are not averaged in, they are ignored. Second, the sharpness of edges is preserved.

Another smoothing method is Gaussian smoothing. Gaussian smoothing is performed by convolving an image with a Gaussian operator which is defined below. By using Gaussian smoothing in conjunction with the Laplacian operator, or another Gaussian operator, it is possible to detect edges.

The Gaussian outputs a "weighted average" of each pixel's neighborhood, with the average weighted more towards the value of the central pixels. The Gaussian distribution function in two variables, g(x,y), is defined by:

$$g(x, y) = \frac{1}{2\pi\sigma^2} e^{-(x^2+y^2)/2\sigma^2}$$

Where σ is the standard deviation representing the width of the Gaussian distribution. The shape of the distribution and hence the amount of smoothing can be controlled by varying σ. In order to smooth an image f(x,y), it is convolved with g(x,y) to produce a smoothed image s(x,y), i.e.,. s(x,y)=f(x, y)*g(x,y).

A further way to compute a Gaussian smoothing with a large standard deviation is to convolve an image several times with a smaller Gaussian. While this is computationally complex, it is practical if the processing is carried out using a hardware pipeline.

Having smoothed the image, e.g., with a Gaussian operator, the edges in the smoothed image can be detected. There are many ways to perform edge detection. However, the majority of different methods may be grouped into two categories, gradient and Laplacian. The gradient method detects the edges by looking for the maximum and minimum in the first derivative of the image. The Laplacian method searches for zero crossings in the second derivative of the image to find edges.

One suitable gradient edge detection algorithm uses the Sobel method. The Sobel operator performs a 2-D spatial gradient measurement on an image. Typically it is used to find the approximate absolute gradient magnitude at each point in an input grayscale image. The Sobel edge detector uses a pair of 3×3 convolution masks, one estimating the gradient in the x-direction (columns) and the other estimating the gradient in the y-direction (rows). A convolution mask is usually much smaller than the actual image. As a result, the mask is slid over the image, manipulating a square of pixels at a time. Illustrative Sobel masks 500, 502 are shown in FIGS. 5A and 5B, respectively.

The magnitude of the gradient is then calculated using the formula:

$$|G|=\sqrt{Gx^2+Gy^2}$$

An approximate magnitude can be calculated using:

$$|G|=|Gx|+|Gy|$$

A pixel location is declared an edge location if the value of the gradient exceeds some threshold. As mentioned above, edges will have higher pixel intensity values than those surrounding it. So once a threshold is set, the gradient value can be compared to the threshold value and an edge detected whenever the threshold is exceeded.

When using the Sobel method, the mask is positioned over an area of the input image, that pixel's value is changed, and then the mask is shifted one pixel to the right. This sequence continues to the right until it reaches the end of a row. The procedure then continues at the beginning of the next row. The example in FIG. 6 shows the mask 500 being slid over the top left portion of the input image 600 represented by the heavy outline 602. The formula below shows how a particular pixel in the output image 604 can be calculated. The center of the mask is placed over the pixel being manipulated in the image. It is important to notice that pixels in the first and last rows, as well as the first and last columns cannot be manipulated by a 3×3 mask. This is because when placing the center of the mask over a pixel in the first row (for example), the mask will be outside the image boundaries.

$$B_{22}=(a_{11}*m_{11})+(a_{12}*m_{12})+(a_{13}*m_{13})+(a_{21}*m_{21})+\\(a_{22}*m_{22})+(a_{23}*m_{23})+a_{31}*m_{31})+(a_{32}*m_{32})+\\(a_{33}*m_{33})$$

The Gx mask highlights the edges in the horizontal direction while the Gy mask highlights the edges in the vertical direction. After taking the magnitude of both, the resulting output detects edges in both directions.

The approximate direction of an edge can further be calculated by assuming the angle of the edge is the inverse tangent of Δy/Δx:

$$\tan^{-1}\left(\frac{\Delta y}{\Delta x}\right)$$

So, for each mask (Gx or Gy), the change in value in the x direction or the change in value in the y direction are calculated to obtain an approximate angle for that edge.

As mentioned before, edges will have higher pixel intensity values than those surrounding it. So once a threshold is set, you can compare the gradient value to the threshold value and detect an edge whenever the threshold is exceeded. Furthermore, when the first derivative is at a maximum, the second derivative is zero. As a result, another alternative to finding the location of an edge is to locate the zeros in the second derivative. This method is known as the Laplacian.

Figures 7, 8, 9:
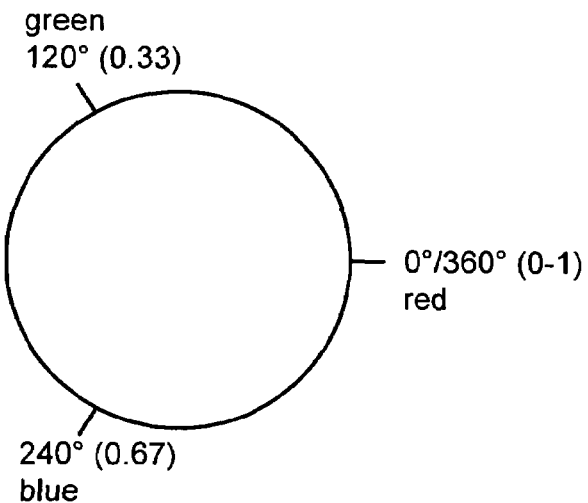
FIG. 7 depicts a Laplace mask, used during an edge detection process according to one embodiment of the present invention.
FIG. 8 illustrates a mask used during shadow detection according to one embodiment of the present invention.
FIG. 9 depicts a color wheel.

In one embedment of the present invention, the 5×5 Laplacian used is a convoluted mask to approximate the second derivative, unlike the Sobel method which approximates the gradient. And instead of two 3×3 Sobel masks, one for each of the x and y directions, Laplace uses one 5×5 mask for the second derivative in both the x and y directions. However, because these masks are approximating a second derivative measurement on the image, they are very sensitive to noise and are therefore less preferable to the Sobel method and thus presented here as an alternate method. The Laplace mask 700 is shown in FIG. 7.

At this point in the processing, the edges and directions (angles) of the edges have been calculated for all of the objects in the 2D image frame. In an image, after smoothing and edge detection, several fringe lines are typically found along the real edge line. In order to make the lines appear clean and continuous, it is desirable to remove the fringe lines and fill in any discontinuities.

Accordingly, the process continues by thinning the lines found during edge detection, and intelligently filling the lines. A hysteresis algorithm known in the art is run to thin each line along the angle calculated for the line. The algorithm removes fringe lines and thins the line. However, this may result in a thin, broken line. The breaks may indicate an end of the line and start of another, or may just be gaps created by the hysteresis algorithm or missing from the original image.

Accordingly, the next step is to identify the ends of the lines. The following equation can be used to find the ends of the line:

Line density=((number of potential pixels+5F−2E)/ number of potential pixels)

where F=number of full pixels, and E=number of empty pixels. The multipliers 5 and 2 are provided by way of example, and can be varied depending on the desired sensitivity. Every pixel along a line is considered a potential pixel, and so each step along the line increases the potential pixel count by one. Every time a pixel is filled in, the count of F is increase by one. When a potential pixel is not filled in, the count of E is increased by one. When the line density drops below zero, the process stops and the system assumes it has found the end of the line.

Now that the ends of the lines are known, a line thickening algorithm is used to run along the line and builds up the line density between the ends previously identified. Every time there is a potential pixel in a gap, the gap is filled in. The result is a solid line.

The foregoing sets up the image for subsequent processing. As mentioned above, the data heretofore generated can be stored in one or more frame buffers. Likewise, results of the subsequent processing steps can also be stored in one or more frame buffers.

The sequence continues by identifying shadows in the 2D image. A preferred method for identifying shadows analyzes how the H, S and V values change across the image using the HSV data previously stored during set up. Thus, the procedure is not just looking for an area that is darker, but rather compares the properties in a given pixel to the properties in surrounding pixels.

A mask is run over the image to detect how H, S and V change in all directions (x and y). An illustrative 3×3 mask 800 is shown in FIG. 8. H runs from 0 to 360 degrees on a color wheel. FIG. 9 depicts a color wheel 900. Assume the angular coordinates are converted to values between 0 and 1, where 0=0° and 1=360°. Thus, 180° corresponds to 0.5, etc. 0 is red, 0.333 (120°) is green, and 0.666 (180°) is blue.

Using the mask, add up H, S and V values for all pixels in the mask (around and including the center pixel). For predetermined values P and Q, if H/S>P, and if S/N>Q, then the center pixel is considered to be in a shadow. These equations are based on the following observations. In a shadow, S goes up, while V goes down. If something is black, S may stay the same. The inventor has also found that shadows in 2D images have a high blue saturation. When an object gets direct light from something, it is receiving almost white light. However, in a shadow, blue light scatters into the shadow, while red and green are blocked out by the object casting the shadow. Thus, H is important because the bluer the pixel H is over S, the more likely it is to be in a shadow. Accordingly, the position and area of a shadow in an image can be estimated. This gives a very good approximation of where the shadows are located.

In any given image, a shadow will typically not be a constituent shade, due in part to the texture of the shadowed image, and in part to the inherent variations in image quality due to such things as equipment (camera) flaws, film variations, and compression effects. These effects may cause errors in the estimation of the shadows on the image. FIG. 10A illustrates how a shadow 1000 may have a jagged edge, for example. Taking advantage of the fact that the edges 1002 in the frame have already been detected, the image is processed both horizontally and vertically to match the shadow 1000 to the nearest edge 1002. If the shadow 1000 is within a certain proximity to the edge 1002 (number of pixels away), the shadow area is moved to the edge. Now the shadows appear close to what they should be, as shown in FIG. 10B.

Next, it may be desirable to soften the shadow so it does not have a hard edge. To achieve this, every pixel that is supposed to be in a shadow, and its neighbors, are analyzed to determine how many of its neighbors are also in the shadow. This can be performed using, e.g., a 3×3 mask. As shown in FIG. 11, if six of the nine pixels in the mask 1100 are marked as being "in" a shadow, thus indicating that it is near an edge of the shadow, the center pixel is given a shadow adjustment value, e.g., of 6/9, which lightens the center pixel by 66.66%. If all pixels in the mask are in a shadow, the center pixel is given a shadow adjustment of 9/9, i.e., no lightening.

The fuzziness on the edge is important because later, when the shadow is cast on a 3D object, the program can consider the darkness of the shadow. So if a pixel is only ⅔ as dark as a pixel in full shadow, only ⅔ of the light gets blocked (not a full shadow) when cast on the 3D object.

At this point, all of the shadows have been identified.

The process next identifies the objects in the 2D image. Note that object identification can be performed earlier, but finding the shadows has some efficiency benefits, as will soon become apparent.

As an optional set up step, the H, S, and V images can be smoothed. The inventor has found through experimentation that the following processes work better after smoothing.

One method for identifying objects is to execute a flood fill algorithm of a type known in the art that groups all areas within a certain color range of each other. Each grouped area can then be considered an object.

A more accurate way to use a flood filling algorithm is to use the average differences in H, S, V, R, G and B to determine how much areas of the image vary in color and H, S and V. In this method, a mask (e.g., 3×3 mask) is run over all of the pixels to determine the average changes between adjacent pixels for all six categories (H, S, V, R, G, B). A flood fill algorithm is executed to find areas of similar pixels outside the shadows. This allows the program to compensate for such things as faded or bright areas on an object, etc.

An illustrative flood fill algorithm looks at a pixel and compares its H, S, V, R, G, and/or B values to those of its neighboring pixels. If the values are within a prespecified range, the pixel is marked as being in a group. The sequence is repeated for the next pixel. For example, the following equation can be used in combination with a 3×3 mask:

If $\Delta\xi/(\text{avg }\Delta\xi \times K) < 1.0$, then in range where $\xi$ is the H, S, V, R, G or B value and K is a constant. $\Delta\xi$ refers to the change in H, S, V, R, G or B value between the center pixel and one of the surrounding pixels in the mask. Avg $\Delta\xi$ refers to the average change in H, S, V, R, G or B value between the center pixel and all of the surrounding pixels in the mask. A computation for some or all of H, S, V, R, G and B can be performed for each pixel. S and R, G, B are preferably given more weight than H and V, because a change in S and R, G, B likely indicates a transition from one object to another.

A further way to use a flood filling algorithm is to perform the foregoing, but use the leveling data described previously.

A preferred method for identifying objects in the 2D image is to use a histogram. In general, the image is analyzed to determine the change in R, G, B, H, S, and/or V between adjacent pixels, and a histogram is created of the changes. Peaks appear in the histogram. These peaks are then used identify edges between objects in the image.

FIG. 12 illustrates a portion of an image 1200 having pixels A1, A2, A3 . . . , B1, B2, B3 . . . , and C1, C2, C3 . . . . The process begins by analyzing the pixel A1 in the bottom left corner of image and comparing the change of each of R, G, B, H, S, and/or V for each pixel A2, B1, B2 adjacent to A1. The comparison process continues, moving across the image and calculating the change of R, G, B, H, S, and/or V for each adjacent pixel not previously analyzed relative to the current pixel of interest. In other words, when analyzing pixel A2 and surrounding pixels, the change in values between A1 and A2 were calculated during analysis of A1 and surrounding pixels and need not be calculated again.

The values for R, G, B, H, S, and/or V can be, for example, 0 to 255. Each change in value is stored in bins ranging from 0 to 255. An illustrative bin 1300 is shown in FIG. 13. Accordingly, if pixel A1 has an R value of 200, and A2 has an R value of 50, the $\Delta R$ would be 150. The bin for a $\Delta R$ value of 150 would increase by one.

Once the image is analyzed, the bin is plotted to create a histogram. An illustrative histogram 1400 is shown in FIG. 14. As shown, the number of instances of little or no change between adjacent pixels is typically large, while the instances of changes of R, G, B, H, S, and/or V typically progressively decrease as the changes become more dramatic.

The inventor has found that peaks 1402 will appear where one object ends and another begins. Accordingly, adjacent pixels having a change in value in the range of the peak are considered to be along an edge. This is because an edge between two different objects will create the same color change between pixels found along that edge. The adjacent pixels having a change in value between the range 1404 of the peak 1402 can be detected during a subsequent flood fill process, can be detected by scanning data saved during analysis of the image for creating the histogram, etc.

The process may have a cutoff value 1406 for the histogram, below which any peaks are not considered. For example, the cutoff value 1406 can be a value between 1 and 50. Typically, the portion of the histogram 1400 below the cutoff value 1406 primarily reflects noise in the image. This process works with any type of image or scene.

Yet another way to identify at least some of the objects in the 2D image frames of a sequence of frames, e.g., a movie, is to use motion-based detection. In this process, changes in position of pixels relative to other pixels indicate that an object is moving. By noting which pixels move and which are stationary from frame to frame, the moving object can be identified. Motion-based detection may also be used to verify and refine the objects detected using one of the other methods described previously.

Now the objects in the 2D image frame are identified. Missing pixels in the objects can be filled in, in a manner similar to the way the shadowed pixels are matched to the edges.

Add 3D Object Data to 2D Frame to Create Composite Image

Data for one or more 3D objects are added to the 2D frame. For the following discussion, assume one 3D object will be added. Those skilled in the art will appreciate that the processing steps described below can be easily replicated for numerous 3D objects per frame, and for any number of frames.

A 3D object is typically a computer-generated object for which the shape, surface texture, curvature, depth (Z-value), reflectivity, transmissivity, refraction index, etc. of each portion of the 3D object is known. The 3D object can be based on standard 3D modeling such as polygonal models, curved surface models such as Bezier and non-uniform rational B-spline (NURBS) models. The 3D object can also be a solid model.

The positioning of the 3D object can be user-defined, can be based on a previous frame or frames in a sequence of frames, etc.

Add Effects and Render 3D Object to Create Composite Image

A depth analysis is performed on the now-identified objects of the 2D image relative to the 3D object to estimate which 2D objects should be shown in front of the 3D object, and which 2D objects will be behind the 3D object as seen from the viewer's viewpoint. One preferred method for performing the depth analysis is to analyze the composite image from the bottom up. For each 2D object that starts below the 3D image, it is assumed that the object will be in front of the 3D image where the two overlap. For each 2D object that starts above the 3D image, the 2D object will be behind the 3D image when the two overlap. The depth analysis can be performed on a vertical basis, where the y values of vertically aligned pixels or sections of pixels are compared. Alternatively, the lowest point of each 2D object can be compared to the lowest point of the 3D object.

Figure 15:
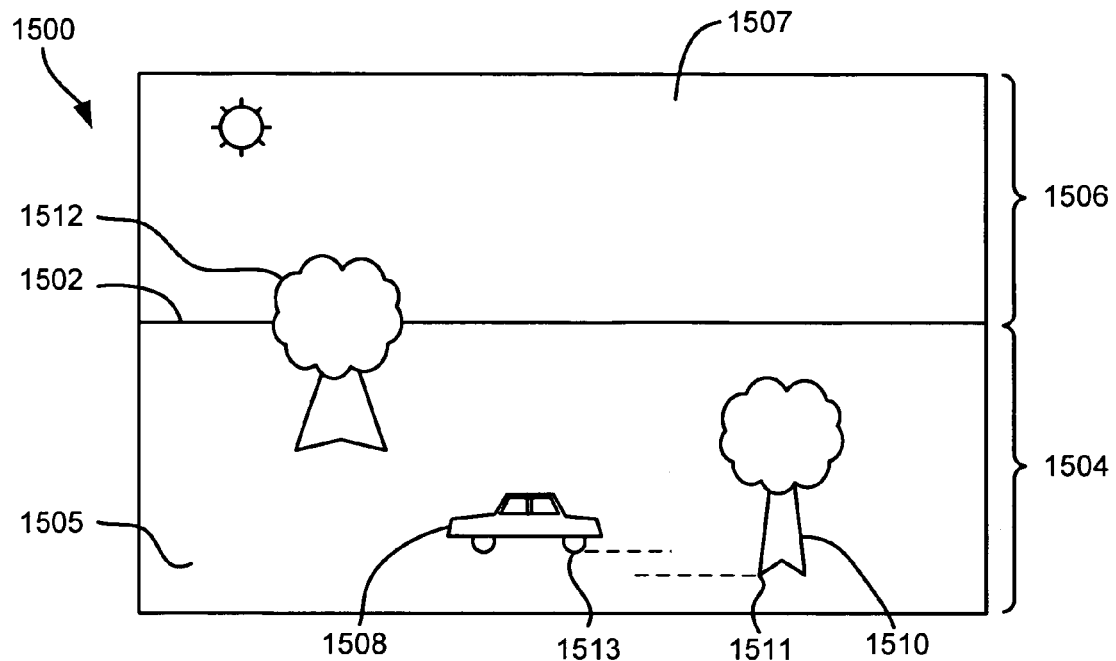
FIG. 15 illustrates an image during a depth analysis process.

Consider the following example, represented in FIG. 15. In most pictures of outdoor scenes, the horizon 1502 is in about the middle of the picture 1500. Accordingly, the bottom half 1504 is likely to be the ground, while the top half 1506 is likely to be the sky. Taking advantage of this probability, the largest object in the bottom half can be marked as the ground 1505, which will be below/behind an overlaid 3D object. The large object in the top half can be marked as the sky 1507, and the sky and anything in the sky will be above/behind the 3D object 1508. A tree 1510 in the frame with its lowest part 1511 starting below the lowest part 1513 of the 3D object 1508 is assumed to be in front of 3D object 1508 and so will overlay the 3D object 1508 in the composite image. Conversely, a tree 1512 in the frame with its lowest point above the lowest point of the 3D object 1508 is assumed to be behind 3D object 1508 and so will be shown as being behind the 3D object 1508 in the composite image.

To further enhance accurate identification of objects in the 2D image, multiple objects having about the same color can be marked as a single object. For example, where the R, G, B, H, S, and/or V values of two objects are within a certain range (e.g., 1-5%) of each other, the two objects will be brought forward or kept in the back of the image. This feature is particularly useful where, for example, the 3D object covers and separates an object such as the ground. By grouping two halves of the ground, the ground will appear to be under and behind the object.

Note that the depth analysis is based on intelligent guessing, and so errors may occur, with the 2D objects incorrectly positioned in front of or behind the 3D object. For example, consider the scenario where a limb of a tree is in the frame, but no other part of the tree is seen. The limb overhangs the 3D object, and perhaps should be positioned in front of the 3D object, but since it is above the 3D object, is assumed to be positioned behind the 3D object. Because the objects in the 2D image are identified and delineated, the user may be allowed to manually call the object forward or shift it to the back. Alternatively, the user can provide a mask to create the proper effect, but the software still performs the analysis in rendering time and so is able to interact with the 2D image in a 3D manner (automatic 3D compositing). Contrast this with prior software which only overlays a 3D object onto a 2D image, with no 3D image information remaining.

To make the image appear realistic, the 3D object is rendered with various environmental effects. Any suitable 3D rendering method can be used, including polygon-based rendering, curved surface model rendering such as Bezier and NURBS rendering, and solid object modeling.

The process of rendering involves ray-tracing, also known as ray-casting, which determines the look of each pixel on the 3D object visible from the viewer's viewpoint. In ray-tracing, the effects of occultation and diffuse and specular reflection, refraction, diffusion of light, and other effects by the various objects and volumes in the scene are determined. Ray tracing not only accounts for primary effects which are the reflections, refractions, and diffusions of light arriving directly from the light sources, but also for secondary reflections. The latter result when primary light from other objects illuminates, or passes through, an object or volume. These secondary effects can involve multiple reflections, refractions, or transmissions between the original light source and the user viewpoint. For the highest quality image, rays must be traced for every pixel in the scene.

Because the 2D image does not contain Z-data, the information known about the various components of the composite image are used to intelligently perform ray tracing. The location of viewer's viewpoint (assumed to be normal to the viewing screen), the plane of the screen, and distance of the 3D object from the screen are known. The 2D objects that are in front of 3D object and the 2D objects that are behind the 3D object are also known.

To generate shadow effects, the position of a light source or sources illuminating the 2D image, e.g., the sun, is determined. The position of the light source can be intelligently estimated based on matching the shape of the shadows to non-shadow objects in the 2D image and ray tracing along the corresponding shadow-to-object edges. The user may also enter the three dimensional coordinates, or preferably the relative angle(s), of the light source or sources. This provides an angle for the shadows cast by the 2D objects. Suppose the program has identified a shadow on the ground behind the 3D object. The program starts at a pixel in that shadow and traces the ray back towards the position of the light source and, if the ray intersects the 3D object, a shadow effect is added to the 3D object at that point on the ray. Also recall that if a pixel is near or on the edge of the shadow, it may only have partial, e.g., ⅔, shading. The partial shading factor can be transferred to the shadow effect added to the 3D image.

Ray tracing is also used to create reflection of 2D objects on the surface of the 3D object. For example, a ray is traced from the viewer's viewpoint to a pixel on the surface of the 3D object. Because the curvature, angle and depth of that pixel is known, the way the ray is reflected off of the 3D object is calculated. If the ray bounces completely to the left, a pixel is selected from the far left of the image and a reflection thereof is added to the 3D object surface at the point of intersection with the ray. If the ray bounces up at 45°, a pixel that is about ¼ of the distance from the top of the frame is selected and a reflection thereof is added to the 3D object surface at the point of intersection with the ray. If the ray bounces back towards the user at 30° to the right of the ray between the user and the 3D object, a pixel that is about ⅙ of the distance from the right of the frame is selected. If the pixel has been previously determined to be of an object in front of the 3D object, e.g., tree, a reflection thereof is added to the 3D object surface at the point of intersection with the ray. Any portion of an object not directly behind the 3D object can be reflected on the 3D object. In this way, rays can be traced to whatever is above, below, in front of, or behind the 3D object. Further, the reflections will reflect the known curvature of the 3D object.

Generation of transparency effects works in a similar manner. A ray extends from the estimated position of the viewer's viewponit to the known transparent or semi-transparent portion of the 3D object. The ray is traced through the 3D object to the 2D pixel data behind it. The pixel from the 2D image is darkened to represent the presence of the semi-transparent portion of the 3D object. If the semi-transparent or transparent portion of the 3D object has a refraction index, the pixel from the 2D image is moved up or down and/or left or right based on the index of refraction.

Another feature is estimation of atmospheric effects. The analysis of the 2D image includes identification of a partially shaded object, and which portion of the object is in direct light and which portion is in a shadow. Using the difference between R, G, B brightness of the shaded and unshaded part, the atmospheric conditions for, e.g., an outdoor scene, may be rated on a predefined scale of 0 for overcast to 100 for sunny and clear. The shadow will receive no direct contribution from the sun, but will receive contribution from scattered light. If the scene is completely overcast, 100% of the light is scattered. If the scene is clear, the amount of scattered light is much less. The surface texture of the 3D object is thus altered to reflect the atmospheric conditions present in the 2D image as well as have the same kind of shadow as in the 2D scene in terms of darkness, effect of light scattering, and other effects.

A particular scene, say with a few clouds, may be analyzed and assigned a value of 65 by linear interpolation between 0 and 100. A shadow thus created on the 3D object will be adjusted using the assigned value to make the shadow mimic other shadows in the scene.

Effects of the 3D object on the environment can also be added. For instance, once the position of the light source(s) is known, the shadow cast by the 3D object can be created by ray tracing from the light source through the 3D object. If the ray intersects the 3D object, the pixel behind the 3D object relative to the light source can be darkened to reflect a shadow cast by the 3D object.

Other effects can also be added to the 3D object and/or 2D image. For example, radiosity can be performed to blend colors along the edges between objects. Caustics effects can be added to, for example, mimic a real-world reflection of 2D objects by a non-flat portion of the 3D object, or vice versa. Motion blur can be added to give the 3D object the appearance of movement through the scene. Depth of field focusing can also be applied to the 3D object to make the 3D object appear to be at a certain depth in the composite image.

Note that when performing ray tracing, several rays per pixel can be generated then averaged. This provides even finer detail. Also note that pixels behind the 3D object do not need to be ray traced (unless the portion of the 3D object has some transparency). Nor is ray tracing necessary for pixels on the 3D object that are not viewable as being covered by a 2D object in front of 3D object.

Other traditional 3D effects can also be performed. For example, suppose the composite image has a first 3D object, and a second 3D object that is partially in front of and partially behind the first 3D object. The depths (Z-value) of each part of the 3D objects can be considered and both 3D objects rendered to appear correctly.

At any point during the processing, the user may be allowed to manually change features of the composite image. For instance, once the composite image has been created, the user can apply masks and rerun the program, using the masks to enhance or clean up the composite image. The user can also be allowed to mask a partially-found 2D object. The pertinent portions of the process can then be rerun to find the rest of the object and attach that previously unassociated portion of the 2D image with the masked object.

Figure 16:
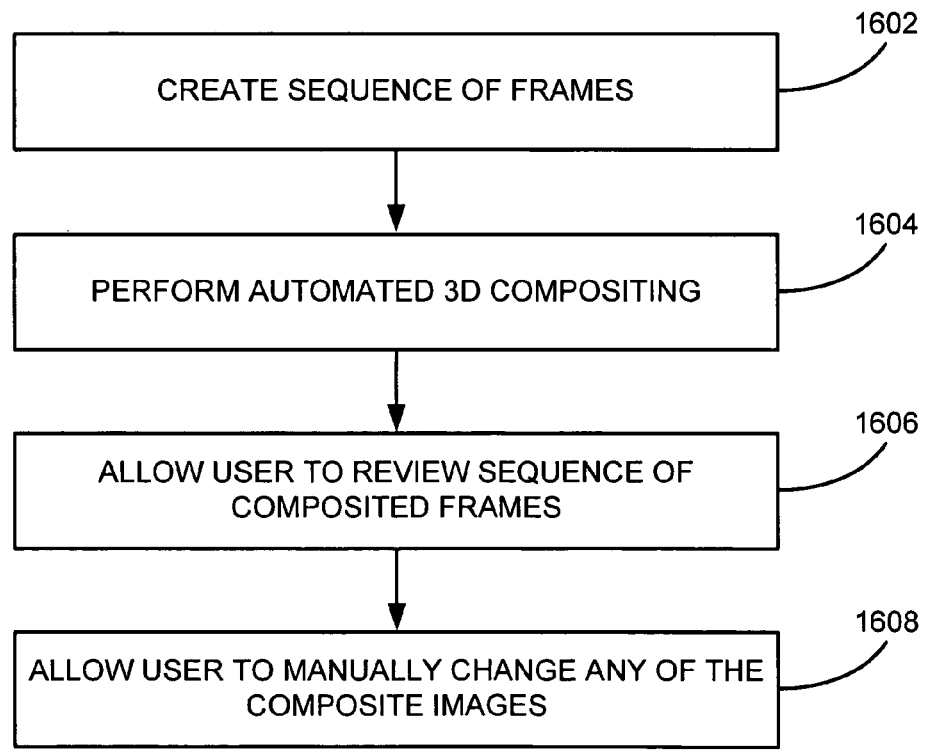
FIG. 16 is flow diagram of a process for making a movie according to one embodiment of the present invention.

FIG. 16 illustrates one example of use of the present invention. Particularly, FIG. 16 illustrates a method 1600 for generating a motion picture. In operation 1602, a sequence of frames are created, each frame having a two dimensional (2D) image of a real-life scene. The sequence of frames can be taken from film, digital camera, scanner, etc. In operation 1604, one or more of the processing steps described above, e.g., of FIG. 2 or 3, are performed for each frame in the sequence for creating a sequence of composite images having one or more 3D objects therein. In operation 1606, a user is allowed to review the composite images, e.g., on a computer screen, via a projection image, etc. In operation 1608, the user is allowed to manually change any of the composite images. This can include calling 2D objects forward or back, touching up the 2D image or 3D object(s), masking, etc.

Another application of the invention include architectural or landscape imaging, such as where the 3D object is a physical building construction such as a home, an office building, a bridge, landscaping feature, etc. The 2D image can be a photograph of an existing scene.

The invention can also be used to generate medical images and movies. For example, the 3D object may represent a human anatomical feature composited with a 2D image of other human anatomical features. The 3D object might also represent a medical device such as a surgical device (e.g., scalpel, laser beam, etc.), mechanical device (e.g., heart pump, artificial bone structure, etc.), etc., while the 2D image includes a real-life human anatomical feature.

An interior design application allows creation of a composite image that includes an interior of a building structure, with one or more 3D objects added to show such things as furniture placement, decorating accents, etc.

Note also that the processes described herein, or portions thereof, may also be incorporated in an image processing software product. A 2D image processing software product according to an embodiment provides one or more of the following features:

Slide show and movie output
Movie mode
Cross-compatibility with existing software products
Batch processing of images
Image labeling
Image search
Matching color schemes across images
Color replacement for changing a color of selected portions of an image
Shadow and highlight correction for improving the contrast of over- or underexposed areas of an image
Photo touch-up including removal of redeye, dust, scratches, blemishes, wrinkles, and other flaws
Dimensional effects such as image wrapping, stretching, curling, bending
Remove image blurring
Correct lens distortion
Image noise reduction
Crop and straighten
Compositing of 2D objects
Painting and drawing tools
Addition of text and labels
Creation of animations
Multi-level undo feature While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for generating an image, comprising the computer implemented steps of:
   analyzing a two dimensional (2D) image for determining several properties thereof;
   detecting edges in the 2D image based on the properties of the 2D image;
   finding objects in the 2D image based at least in part on the properties of the 2D image;
   adding a three dimensional (3D) object to the 2D image;
   estimating which objects in the 2D image are positioned in front of the 3D object, or which objects in the 2D image are positioned behind the 3D object;
   rendering the following effects: a reflection of one of the objects in the 2D image on an outer surface of the 3D object a shadow cast by one of the objects in the 2D image on an outer surface of the 3D object, a representation of one of the objects in the 2D image viewable through a transparent or semi-transparent portion of the 3D object, and an effect of refraction on one of the objects in the 2D image viewable through a transparent or semi-transparent portion of the 3D object; and providing the following features:
slide show and movie output,
batch processing of images,
image labeling,
matching color schemes across multiple images,
color replacement for changing a color of selected portions of an image,
shadow and highlight correction for improving the contrast of over- or underexposed areas of an image
photo touch-up including removal of redeye, dust, scratches, blemishes, wrinkles,
dimensional effects including image wrapping, stretching, curling, and bending,
removing image blurring,
correcting lens distortion,
image noise reduction,
cropping and straightening an image,
painting and drawing tools, and
allowing addition of text and labels.

2. A method as recited in claim 1, wherein the properties are selected from a group consisting of hue, saturation, brightness, red color content, green color content, and blue color content.

3. A method as recited in claim 1, wherein the properties include each of hue, saturation, brightness, red color content, green color content, and blue color content.

4. A method as recited in claim 1, further comprising smoothing the 2D image prior to detecting the edges in the 2D image.

5. A method as recited in claim 1, further comprising refining lines based on the detected edges in the 2D image.

6. A method as recited in claim 1, further comprising detecting shadows in the 2D image based at least in part on the properties of the 2D image.

7. A method as recited in claim 6, further comprising adjusting a boundary of the detected shadows in the 2D image based on a proximity to the detected edges.

8. A method as recited in claim 1, further comprising adjusting the shadow cast by one of the objects in the 2D image on the outer surface of the 3D object to reflect an atmospheric condition in the 2D image.

9. A method as recited in claim 1, further comprising adjusting the outer surface of the 3D object based on an effect of an atmospheric condition in the 2D image.

10. A method as recited in claim 1, wherein the objects in the 2D image are found using a flood fill algorithm.

11. A method as recited in claim 1, wherein the objects in the 2D image are found using a histogram.

12. A method as recited in claim 1, wherein at least some of the objects in the 2D image are found using motion-based detection.

13. A method as recited in claim 1, further comprising storing leveling data, wherein the finding the objects in the 2D image uses the leveling data.

14. A method as recited in claim 1, further comprising performing radiosity processing.

15. A method as recited in claim 1, further comprising performing caustics processing.

16. A method as recited in claim 1, further comprising adding motion blur to the 3D object.

17. A method as recited in claim 1, further comprising performing depth of field focusing.

18. A method as recited in claim 1, wherein the effects are added to the 3D object based at least in part on ray tracing.

19. A method as recited in claim 1, wherein the method is performed for a series of images.

20. A method for generating a motion picture, comprising:
creating a sequence of frames, each frame having a two dimensional (2D) image of a real-life scene;
performing the method of claim 1 for each frame in the sequence for creating a sequence of composite images; and
allowing a user to review the composite images.

21. A method as recited in claim 20, further comprising allowing the user to manually change the composite images.

22. A method for generating a composite image, comprising:
performing the method of claim 1 for creating a composite image, wherein the 3D object represents a physical building construction.

23. A method for generating a medical image, comprising:
performing the method of claim 1 for creating a composite image, wherein the 3D object represents a human anatomical feature.

24. A method for generating a medical image, comprising:
performing the method of claim 1 for creating a composite image, wherein the 3D object represents a medical device.

25. A method as recited in claim 24, wherein the 2D image includes a real-life human anatomical feature.

26. A method as recited in claim 1, wherein the image includes a landscape.

27. A method as recited in claim 1, wherein the image includes an interior of a building structure.

28. A method as recited in claim 1, further comprising allowing a user to apply masks for manipulating the image.

29. A method as recited in claim 28, further comprising allowing the user to mask a 2D object, and attaching a previously unassociated portion of the 2D image with the masked object.

30. A method as recited in claim 1, further comprising:
storing leveling data, wherein the finding the objects in the 2D image uses the leveling data;
performing radiosity processing;
performing caustics processing;
adding motion blur to the 3D object,
wherein at least some of the objects in the 2D image are found using motion-based detection.

31. A method for generating an image, comprising the computer implemented steps of:
adding a three dimensional (3D) object to a two dimensional (2D) image;
rendering a reflection of one of the objects in the 2D image on an outer surface of the 3D object; rendering a shadow cast by one of the objects in the 2D image on an outer surface of the 3D object;
rendering a representation of one of the objects in the 2D image viewable through a transparent or semi-transparent portion of the 3D object;
rendering an effect of refraction on one of the objects in the 2D image viewable through the transparent or semi-transparent portion of the 3D object; and
storing leveling data, wherein the objects in the 2D image are found using the leveling data; performing radiosity processing; performing caustics processing; adding motion blur to the 3D object, wherein at least some of the objects in the 2D image are found using motion-based detection.

32. A method as recited in claim 31, further comprising wherein the user is allowed to apply the mask after the image is generated and repeating at least some of the steps.

33. A method as recited in claim 31, further comprising allowing the user to mask a partially-found 2D object, and attaching a previously unassociated portion of the 2D image with the masked object.

34. A method for generating a motion picture, comprising:
creating a sequence of frames, each frame having a two dimensional (2D) image of a real-life scene;
performing the method of claim 31 for each frame in the sequence for creating a sequence of composite images; and
allowing a user to review the composite images.

35. A method as recited in claim 34, further comprising allowing the user to manually change the composite images.

36. A method for generating a composite image, comprising:
performing the method of claim 31 for creating a composite image, wherein the 3D object represents a physical building construction.

37. A method for generating a medical image, comprising:
performing the method of claim 31 for creating a composite image, wherein the 3D object represents a human anatomical feature.

38. A method for generating a medical image, comprising:
performing the method of claim 31 for creating a composite image, wherein the 3D object represents a medical device.

39. A method as recited in claim 38, wherein the 2D image includes a real-life human anatomical feature.

40. A method as recited in claim 31, wherein the image includes a landscape.

41. A method as recited in claim 31, wherein the image includes an interior of a building structure.

42. A method as recited in claim 31, further comprising providing the following features:
slide show and movie output,
batch processing of images,
image labeling,
matching color schemes across multiple images,
color replacement for changing a color of selected portions of an image,
shadow and highlight correction for improving the contrast of over- or underexposed areas of an image
photo touch-up including removal of redeye, dust, scratches, blemishes, wrinkles,
dimensional effects including image wrapping, stretching, curling, and bending,
removing image blurring,
correcting lens distortion,
image noise reduction,
cropping and straightening an image,
painting and drawing tools, and
allowing addition of text and labels.

43. A method as recited in claim 31, further comprising allowing a user to apply masks for manipulating the image.

44. A method for generating an image, comprising the computer implemented steps of:
analyzing a two dimensional (2D) image for determining several properties thereof, wherein the properties are selected from a group consisting of hue, saturation, brightness, red color content, green color content, and blue color content;
smoothing the 2D image;
detecting edges in the 2D image based on the properties of the 2D image;
refining lines based on the detected edges in the 2D image;
detecting shadows in the 2D image based at least in part on the properties of the 2D image; adjusting a boundary of the detected shadows in the 2D image based on a proximity to the detected edges;
finding objects in the 2D image based at least in part on the properties of the 2D image;
adding a three dimensional (3D) object to the 2D image;
estimating which objects in the 2D image are positioned in front of the 3D object, or which objects in the 2D image are positioned behind the 3D object;
rendering the following effects: a reflection of one of the objects in the 2D image on an outer surface of the 3D object, a shadow cast by one of the objects in the 2D image on an outer surface of the 3D object, a representation of one of the objects in the 2D image viewable through a transparent or semi-transparent portion of the 3D object, and an effect of refraction on one of the objects in the 2D image viewable through a transparent or semi-transparent portion of the 3D object.

45. A method as recited in claim 44, further comprising adjusting the shadow cast by one of the objects in the 2D image on the outer surface of the 3D object to reflect an atmospheric condition in the 2D image.

46. A method as recited in claim 45, further comprising adjusting the outer surface of the 3D object based on an effect of an atmospheric condition in the 2D image.

47. A method as recited in claim 46, further comprising storing leveling data, wherein the finding the objects in the 2D image uses the leveling data.

48. A method as recited in claim 47, further comprising performing radiosity processing, caustics processing, adding motion blur to the 3D object, and performing depth of field focusing.

49. A method as recited in claim 44, wherein the method is performed for a series of images.

\* \* \* \* \*

UNITED STATES PATENT AND TRADEMARK OFFICE
CERTIFICATE OF CORRECTION

PATENT NO. : 7,477,777 B2  Page 1 of 1
APPLICATION NO. : 11/262262
DATED : January 13, 2009
INVENTOR(S) : Wells It is certified that error appears in the above-identified patent and that said Letters Patent is hereby corrected as shown below:

In the claims:
Col. 16, line 61, please replace "object a" with --object, a--.

Signed and Sealed this
Twelfth Day of July, 2011

David J. Kappos
*Director of the United States Patent and Trademark Office*